(12) United States Patent
Ohyama et al.

(10) Patent No.: US 10,465,953 B2
(45) Date of Patent: Nov. 5, 2019

(54) AIR CONDITIONING APPARATUS

(71) Applicant: DENSO CORPORATION, Kariya, Aichi-pref. (JP)

(72) Inventors: Teruaki Ohyama, Kariya (JP); Yuji Kamiya, Kariya (JP); Tomoyuki Sumi, Kariya (JP); Akitomo Yamanaka, Kariya (JP); Koji Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 255 days.

(21) Appl. No.: 15/543,287

(22) PCT Filed: Jan. 27, 2016

(86) PCT No.: PCT/JP2016/000395
§ 371 (c)(1),
(2) Date: Jul. 13, 2017

(87) PCT Pub. No.: WO2016/121385
PCT Pub. Date: Aug. 4, 2016

(65) Prior Publication Data
US 2017/0370626 A1   Dec. 28, 2017

(30) Foreign Application Priority Data
Jan. 30, 2015   (JP) ................................ 2015-016381

(51) Int. Cl.
*F25B 5/04* (2006.01)
*F25B 31/00* (2006.01)
(Continued)

(52) U.S. Cl.
CPC ............ *F25B 31/006* (2013.01); *F04D 25/06* (2013.01); *F04D 27/004* (2013.01);
(Continued)

(58) Field of Classification Search
CPC .............. F04D 25/0666; B60H 1/3205; B60H 2001/3257; B60H 2001/3272;
(Continued)

(56) References Cited

U.S. PATENT DOCUMENTS 8,328,525 B2 * 12/2012 Saito ..................... F04C 23/008
                                                         417/32
8,823,292 B2 *  9/2014 Sumi ..................... F04B 35/04
                                                         318/34
(Continued)

FOREIGN PATENT DOCUMENTS

DE          10326171 A1    12/2003
JP          61016278 A  *  1/1986  .............. F04B 49/06
(Continued)

*Primary Examiner* — Patrick Hamo
(74) *Attorney, Agent, or Firm* — Harness, Dickey & Pierce, P.L.C.

(57) ABSTRACT

An air conditioning apparatus includes an electric compressor, an inverter, a temperature detection element, and an ECU. The electric compressor compresses a refrigerant drawn from a refrigerant intake port and discharges the refrigerant from a refrigerant discharge port. The inverter is integrated with the electric compressor so as to be cooled by the drawn refrigerant, and operates the electric compressor according to a control signal. The temperature detection element detects a temperature of the inverter. The ECU outputs a control signal to control the inverter. The ECU performs any one or both of a control for reducing a self-cooling amount of the electric compressor and a control for increasing a self-heat generation amount of the inverter with respect to the inverter when the temperature detected by the temperature detection element is lower than a predetermined reference temperature.

8 Claims, 6 Drawing Sheets

(51) Int. Cl.
   *F04D 25/06* (2006.01)
   *F04D 27/00* (2006.01)
   *F25B 49/02* (2006.01)

(52) U.S. Cl.
   CPC .... *F25B 49/022* (2013.01); *F25B 2600/0253* (2013.01); *F25B 2700/21156* (2013.01)

(58) Field of Classification Search
   CPC .. F25B 2700/21156; F25B 2700/21157; Y02B 30/741
   See application file for complete search history.

(56) References Cited

U.S. PATENT DOCUMENTS

| | | | |
|---|---|---|---|
| 9,574,805 B2 * | 2/2017 | Yang | F25B 31/006 |
| 2003/0230101 A1 | 12/2003 | Iritani et al. | |
| 2009/0092501 A1 * | 4/2009 | Seibel | F04B 35/04 |
| | | | 417/44.1 |
| 2017/0370626 A1 * | 12/2017 | Ohyama | F04D 25/06 |

FOREIGN PATENT DOCUMENTS

| | | | | |
|---|---|---|---|---|
| JP | 62000680 A * | 1/1987 | | F04B 49/06 |
| JP | H06159738 A | 6/1994 | | |
| JP | H07285323 A | 10/1995 | | |
| JP | H08040053 A | 2/1996 | | |
| JP | 2004212004 A | 7/2004 | | |
| JP | 2004271167 A | 9/2004 | | |
| JP | 2005291558 A | 10/2005 | | |
| JP | 2005326054 A | 11/2005 | | |
| WO | WO-2015189010 A1 * | 12/2015 | | F25B 49/02 |
| WO | WO-2017177287 A2 * | 10/2017 | | F04B 49/06 |

\* cited by examiner

AIR CONDITIONING APPARATUS

CROSS REFERENCE TO RELATED APPLICATIONS

This application is a U.S. National Phase Application under 35 U.S.C. 371 of International Application No. PCT/JP2016/000395 filed on Jan. 27, 2016 and published in Japanese as WO 2016/121385 A1 on Aug. 4, 2016. This application is based on and claims the benefit of priority from Japanese Patent Application No. 2015-016381 filed on Jan. 30, 2015. The entire disclosures of all of the above applications are incorporated herein by reference.

TECHNICAL FIELD

The present disclosure relates to an air conditioning apparatus including an electric compressor that is integrated with an inverter.

BACKGROUND ART

An air conditioning apparatus that measures a refrigerant temperature and limits an upper limit rotation speed of a compressor when a refrigerant temperature is lower than a predetermined value to prevent a liquid compression and a lubrication failure from occurring has been proposed in, for example, Patent Literature 1. The compressor operates by rotation of an electric motor under the control of an inverter having electronic components such as a power element.

PRIOR ART LITERATURES

Patent Literature

Patent Literature 1: JP 2005-291558 A

SUMMARY

In this case, a configuration in which an inverter is integrated with a compressor in order to cool an electronic component configuring the inverter with a circulating refrigerant has been known. As a result, the electronic components are cooled by the refrigerant flowing into the compressor.

However, under circumstances such as a low temperature environment, the refrigerant drawn into the compressor may fall below a minimum operation guaranteed temperature of the electronic component. Specifically, when the compressor is stopped, heat generation by the electronic component itself disappears while the refrigerant that has been circulated until then continues to flow into the compressor due to its inertia. This leads to a possibility that the electronic component is excessively cooled to a minimum guaranteed temperature or lower, and eventually damaged.

In order to prevent the above damage, it is conceivable to provide the compressor with a protection function to stop the operation of the compressor when the temperature of the electronic component falls below the minimum operation guaranteed temperature. In this case, there is a need to set a protection temperature threshold to a higher temperature in anticipation of a temperature drop of the electronic component when the compressor is stopped. However, setting the protection temperature threshold to a higher value means that the compressor is not operated under a low temperature environment. For that reason, a new problem arises that the operation guaranteed temperature range of electronic components under a low temperature environment is limited.

In view of the foregoing difficulties, it is an object of the present disclosure to provide an air conditioning apparatus capable of preventing an electronic component forming an inverter from being destroyed by excessive cooling of an electric compressor that is integrated with an inverter under a low temperature environment.

An air conditioning apparatus according to the present disclosure includes an electric compressor, a drive unit, a temperature detection unit, and a control unit.

The electric compressor compresses a refrigerant drawn from a refrigerant intake port and discharges the refrigerant from a refrigerant discharge port. The drive unit is integrated with the electric compressor so as to be cooled by the refrigerant drawn from the refrigerant intake port of the electric compressor, the drive unit operating the electric compressor according to a control signal. The temperature detection unit detects a temperature of the drive unit. The control unit outputs the control signal to the drive unit to control the drive unit.

The control unit is configured to, when the temperature detected by the temperature detection unit is lower than a predetermined reference temperature, perform with respect to the drive unit any one or both of: a control for reducing a self-cooling amount of the electric compressor, and a control for increasing a self-heat generation amount of the drive unit.

According to the above configuration, since the self-cooling amount of the electric compressor is lowered, the drive unit can be prevented from being excessively cooled by the refrigerant. In addition, since the self-heat generation amount of the drive unit increases, the temperature of the drive unit itself can be increased. For that reason, the temperature of the electronic component forming the drive unit can be prevented from falling below the minimum guaranteed temperature by excessive cooling of the electric compressor under the low temperature environment. Therefore, the breakage of the drive unit can be prevented.

BRIEF DESCRIPTION OF DRAWINGS

The object and another objects, features, and advantages of the present disclosure will be more clarified on the basis of the following detailed descriptions with reference to the accompanying drawings.

DESCRIPTION OF EMBODIMENTS

Hereinafter, an embodiment of the present disclosure will be described based on the drawings.

Hereinafter, an embodiment of the present disclosure will be described with reference to the drawings. The air conditioning apparatus according to the present embodiment is mounted in a vehicle and performs an air conditioning control in a vehicle interior by a heat pump cycle.

Figure 1:
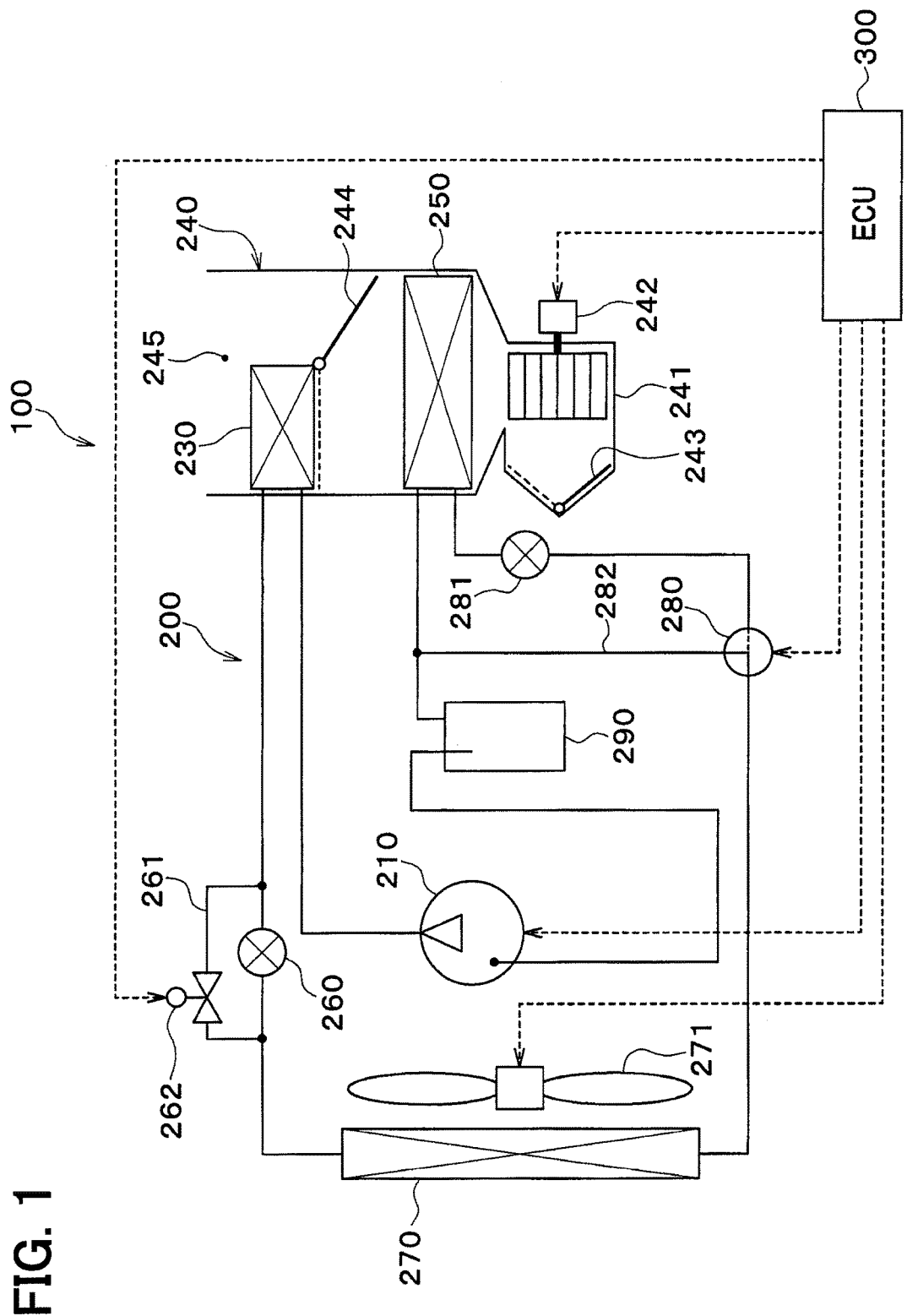
FIG. 1 is a diagram illustrating an overall configuration of an air conditioning apparatus according to an embodiment.

In an air conditioning apparatus 100 illustrated in FIG. 1, a heat pump cycle 200 heats or cools an air (blown air) blown into a vehicle interior that is an air-conditioning target space. Therefore, the heat pump cycle 200 switches a refrigerant flow channel, thereby being capable of executing, as a normal environment control, a heating operation (heating operation) for heating a vehicle interior by heating air that is a heat exchange target fluid, and a cooling operation (cooling operation) for cooling the vehicle interior by cooling the air.

The heat pump cycle 200 according to the present embodiment employs a normal fluorocarbon refrigerant as the refrigerant, and configures a subcritical refrigeration cycle in which a high-pressure side refrigerant pressure does not exceed a critical pressure of the refrigerant. A refrigerator oil for lubricating an electric compressor 210 is mixed in the refrigerant, and a part of the refrigerator oil circulates in a cycle together with the refrigerant.

Figure 2:
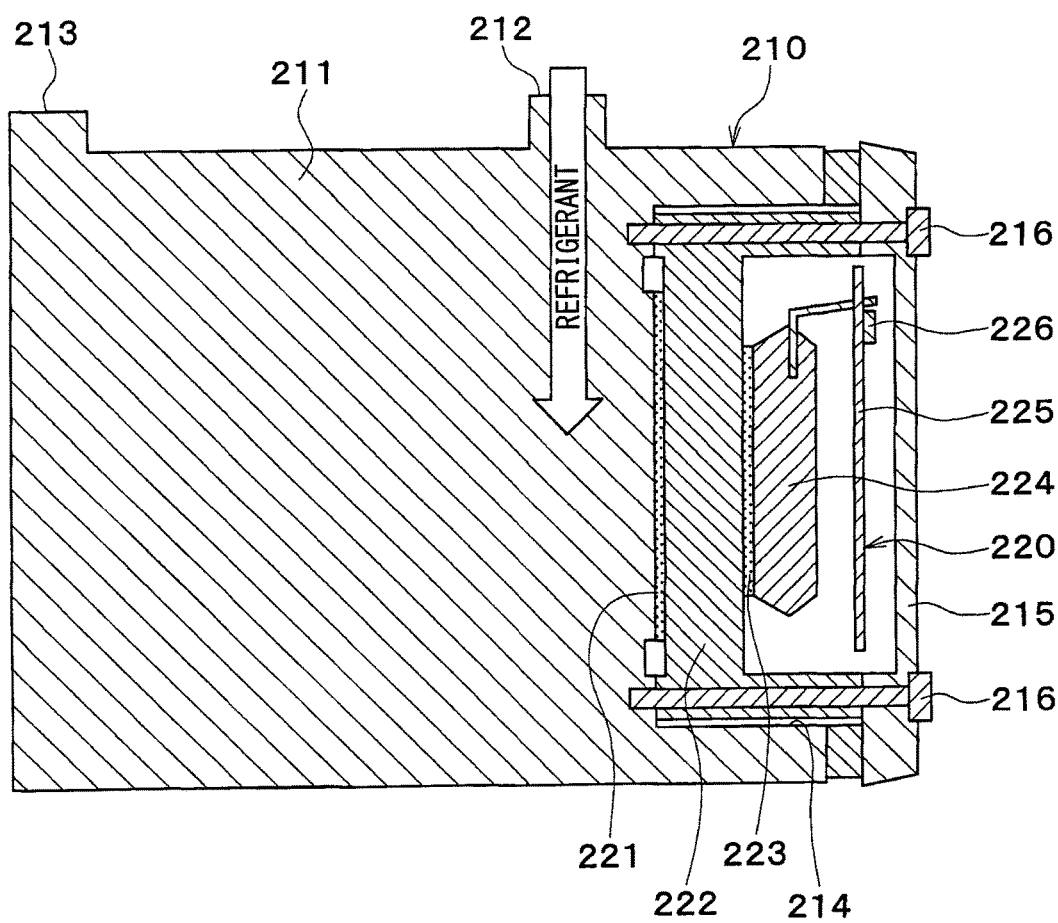
FIG. 2 is a cross-sectional view of an electric compressor integrated with an inverter.

First, the electric compressor 210 is disposed in an engine compartment, and draws, compresses, and discharges the refrigerant in the heat pump cycle 200. Specifically, as illustrated in FIG. 2, the electric compressor 210 has a structure in which an inverter 220 is integrated with a housing 211.

Figure 7:
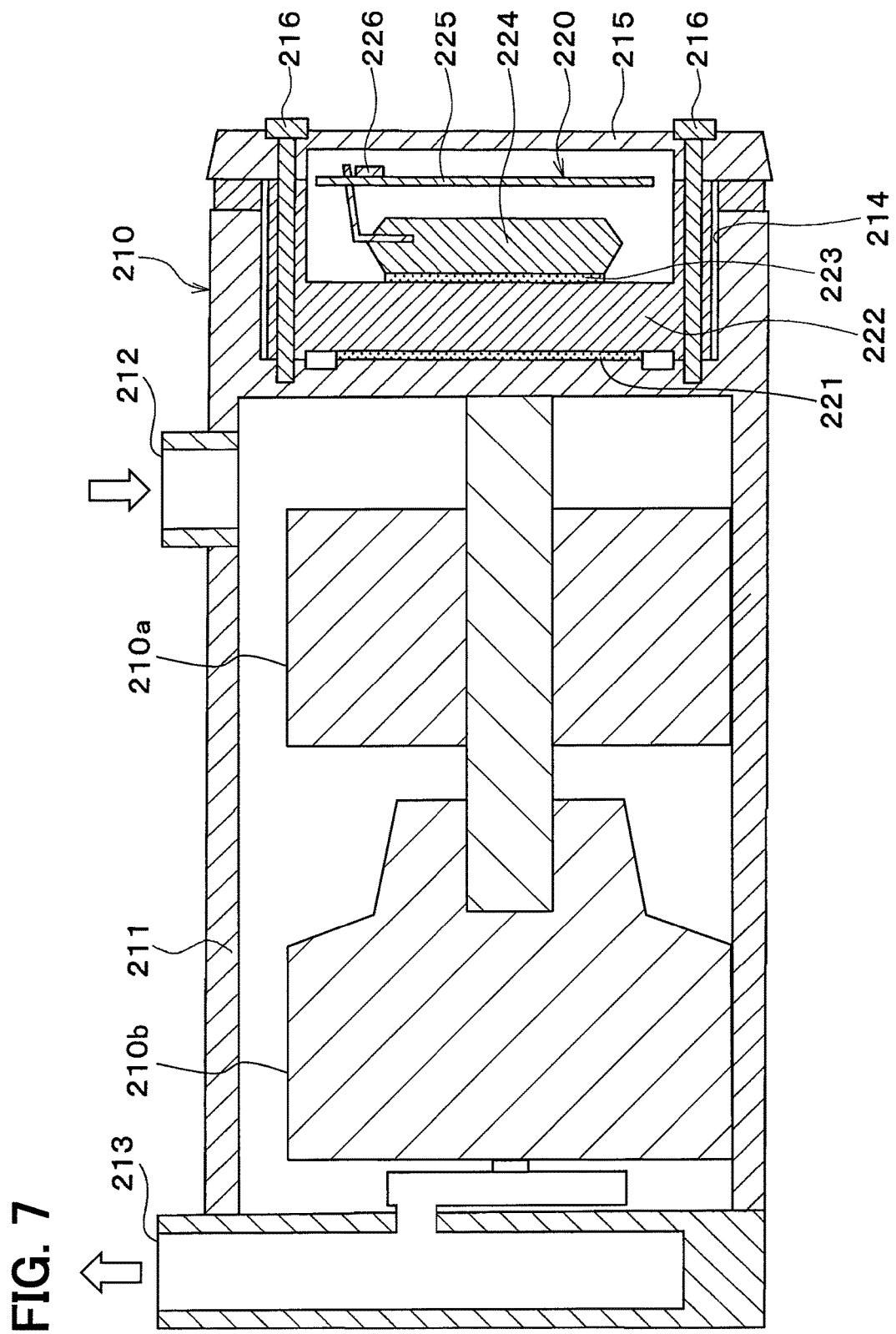
FIG. 7 is a cross-sectional view schematically illustrating an internal structure of the electric compressor.

As illustrated in FIG. 7, the housing 211 is a casing in which a refrigerant flow space is provided, and includes a refrigerant intake port 212 and a refrigerant discharge port 213. The refrigerant drawn from the refrigerant intake port 212 flows through the refrigerant flow space and is discharged from the refrigerant discharge port 213. Further, the housing 211 houses an electric motor 210a and a compression mechanism 201b for compressing the refrigerant in the refrigerant flow space. Incidentally, in FIG. 2, specific structures of the electric motor 210a and the compression mechanism 210b are omitted.

The operation (rotation speed) of the electric motor 210a is controlled by driving the inverter 220 based on a control signal from an air conditioner control ECU 300 to be described later. In the following description, the air conditioner control ECU 300 will be simply referred to as an ECU 300. The electric motor 210a may employ any type of an AC motor and a DC motor. The compression mechanism 210b compresses the refrigerant and is driven by the electric motor 210a. In the present embodiment, a scroll-type compression mechanism is employed as the compression mechanism 210b, but other mechanisms may be employed. A control signal for instructing a target rotation speed is output from the ECU 300 to the inverter 220, and the inverter 220 controls the rotation speed of the electric motor 210a, to thereby adjust the refrigerant discharge capacity of the compression mechanism 210b. In other words, as the rotation speed of the electric motor 210a is increased more, a flow rate (flow velocity) of the refrigerant flowing through the refrigerant flow space of the housing 211 increases more. As a result, the refrigerant discharge capacity of the compression mechanism 210b increases. On the other hand, as the rotation speed of the electric motor 210a is decreased more, the flow rate of the refrigerant flowing through the refrigerant flow space of the housing 211 decreases more. As a result, the refrigerant discharge capacity of the compression mechanism 210b decreases.

The inverter 220 is accommodated in a groove portion 214 provided on the refrigerant intake port 212 side of the housing 211. The inverter 220 includes a heat sink 222, a power element 224, and a circuit board 225. The heat sink 222 is disposed in the groove portion 214 through a thermal grease 221. The power element 224 is disposed on the heat sink 222 through a thermal grease 223. A power element 224 is mounted on the circuit board 225. In addition, the inverter 220 also includes electronic components (not shown) such as a microcomputer. The inverter 220 drives the power element 224 according to a control signal input from the ECU 300. When the power element 224 is driven, the electric motor 210a rotates.

The heat sink 222 is pressed against a bottom portion of the groove portion 214 by a lid portion 215 and is fixed to the groove portion 214 by screws 216. Thus, the inverter 220 is housed in the housing 211.

In addition, the heat generated by the power element 224 is transmitted to the housing 211 through the thermal grease 223, the heat sink 222, and the thermal grease 221. As described above, since the housing 211 draws the refrigerant from the refrigerant intake port 212, the heat of the power element 224 is absorbed by the refrigerant. In other words, the inverter 220 is integrated with the electric compressor 210 so as to be cooled by the refrigerant drawn from the refrigerant intake port 212 of the electric compressor 210.

In this example, a temperature detection element 226 for detecting a temperature of the inverter 220 is mounted on the circuit board 225 of the inverter 220. The temperature detection element 226 is, for example, a thermistor. The temperature detection element 226 outputs a temperature signal to the ECU 300. It should be noted that the temperature detection element 226 may not be mounted on the circuit board 225. In other words, as long as the temperature of the inverter 220 can be detected, the temperature detection element 226 may be placed anywhere in the groove portion 214 of the housing 211.

A refrigerant inlet side of an interior condenser 230 as a usage side heat exchanger is connected to the refrigerant discharge port 213 of the electric compressor 210 illustrated in FIG. 1. The interior condenser 230 is a heating heat exchanger that is disposed in a casing 241 of an interior air conditioning unit 240 of the air conditioning apparatus 100 for performing a heat exchange between a high-temperature high-pressure refrigerant flowing in the interior condenser 230 and an air that has passed through an evaporator 250 to be described later. Incidentally, the detailed configuration of the interior air conditioning unit 240 will be described later.

A refrigerant outlet side of the interior condenser 230 is connected with a heating expansion valve 260 as a pressure reducing portion for heating operation for pressure-reducing and expanding the refrigerant that has flowed out of the interior condenser 230 during the heating operation. A refrigerant inlet side of an exterior condenser 270 is connected to an outlet side of the heating expansion valve 260.

Furthermore, a bypass passage 261 is connected to the refrigerant outlet side of the interior condenser 230. The bypass passage 261 leads the refrigerant that has flowed out from the interior condenser 230 to the exterior condenser 270 side while bypassing the heating expansion valve 260. A two-way valve 262 for opening and closing the bypass passage 261 is disposed in the bypass passage 261. The two-way valve 262 is an electromagnetic valve whose opening/closing operation is controlled by a control voltage output from the ECU 300, which is a refrigerant flow channel switching portion.

A pressure loss generated when the refrigerant passes through the two-way valve 262 is extremely small as compared with a pressure loss generated when passing through the heating expansion valve 260. Therefore, when the two-way valve 262 is open, the refrigerant that has flowed out from the interior condenser 230 flows into an exterior condenser 270 through the bypass passage 261 side. When the two-way valve 262 is closed, the refrigerant flows into the exterior condenser 270 through the heating expansion valve 260. As a result, the two-way valve 262 can switch the refrigerant flow channel of the heat pump cycle 200.

The exterior condenser 270 exchanges a heat between the low-pressure refrigerant flowing inside and the outside air blown from an exterior fan 271. The exterior condenser 270 is a heat exchanger that is disposed in an engine compartment, functions as an evaporator that evaporates the low-pressure refrigerant to exert a heat absorbing action during heating operation, and functions as a radiator that radiates the heat of the high-pressure refrigerant during cooling operation.

Further, the exterior fan 271 is an electric blower whose operation rate, that is, rotation speed (the amount of air to be blown) is controlled according to a control voltage output from the ECU 300.

An electric three-way valve 280 is connected to an outlet side of the exterior condenser 270. The operation of the three-way valve 280 is controlled according to the control voltage output from the ECU 300, and forms a refrigerant flow channel switching portion in the same manner as that of the two-way valve 262 described above.

Specifically, during the heating operation, the three-way valve 280 switches to a refrigerant flow channel that connects the outlet side of the exterior condenser 270 and an inlet side of an accumulator 290 described later. On the other hand, during the cooling operation, the three-way valve 280 switches to a refrigerant flow channel that connects the outlet side of the exterior condenser 270 and an inlet side of a cooling expansion valve 281.

The cooling expansion valve 281 is a pressure reducing portion for the cooling operation (for cooling operation) for pressure reducing and expanding the refrigerant that has flowed out from the exterior condenser 270 during the cooling operation, and a basic configuration of the cooling expansion valve 281 is the same as that of the heating expansion valve 260. A refrigerant inlet side of the evaporator 250 is connected to an outlet side of the cooling expansion valve 281.

The evaporator 250 is a cooling heat exchanger that is disposed in the casing 241 of the interior air conditioning unit 240 in the upstream side of the interior condenser 230 in the air flow, exchanges a heat between the refrigerant flowing in the evaporator 250 and the air so as to cool the air. The inlet side of the accumulator 290 is connected to the refrigerant outlet side of the evaporator 250.

Therefore, the refrigerant flow channel extending from the three-way valve 280 through which the refrigerant flows to the inlet side of the accumulator 290 during the heating operation configures a bypass passage 282 through which the refrigerant in the downstream side of the exterior condenser 270 flows while bypassing the evaporator 250. Further, the three-way valve 280 configures a bypass passage switching unit that switches between a refrigerant circuit for leading the refrigerant in the downstream side of the exterior condenser 270 to the evaporator 250 side and a refrigerant circuit for leading the refrigerant downstream of the exterior condenser 270 to the bypass passage 282 side.

The accumulator 290 is a gas-liquid separator for the low-pressure side refrigerant which separates the refrigerant flowing in the accumulator 290 into gas and liquid and accumulates an excess refrigerant in the cycle. An intake side of the electric compressor 210 is connected to a gas-phase refrigerant outlet of the accumulator 290. Therefore, the accumulator 290 reduces the liquid-phase refrigerant to be drawn into the electric compressor 210, and prevents liquid compression of the electric compressor 210.

Next, the interior air conditioning unit 240 will be described. The interior air conditioning unit 240 is disposed inside of a dashboard panel (an instrument panel) in a foremost portion of the vehicle compartment, and accommodates a blower 242, the above-described interior condenser 230, the evaporator 250, and the like in the casing 241 which forms an outer shell of the interior air conditioning unit 240.

The casing 241 is provided with an air passage of the air which is blown into the vehicle interior, and is made of a resin (for example, polypropylene) having some degree of elasticity and excellent in strength. An inside/outside air switching device 243 configured to switch the vehicle interior air (inside air) and the outside air is arranged on the most upstream side along the air flow in the casing 241.

The inside/outside air switching device 243 is an inside/outside air switching unit that continuously adjusts opening areas of an inside air introduction port for introducing the inside air into the casing 241 and an outside air introduction port for introducing the outside air by the inside/outside air switching door, and continuously changes an introduction ratio of the inside air and the outside air to switch a suction port mode.

The inside/outside air switching device 243 is provided with an inside air introduction port for introducing the inside air into the casing 241 and an outside air introduction port for introducing the outside air into the casing 241. Furthermore, an inside/outside air switching door that continuously adjusts opening areas of the inside air introduction port and the outside air introduction port to change an air volume ratio between an air volume of the inside air and an air volume of the outside air is disposed in the interior of the inside/outside air switching device 243. The inside/outside air switching door is driven by an electric actuator (not shown) whose operation is controlled by the control signal output from the ECU 300.

The suction port mode that is switched by the inside/outside air switching device 243 includes an inside air mode in which the inside air introduction port is fully opened and the outside air introduction port is fully closed to introduce the inside air into the casing 241. In addition, the intake port mode includes an outside air mode in which the inside air introduction port is fully closed and the outside air introduction port is fully opened to introduce the outside air into the casing 241, and an inside/outside air mixing mode in which the inside air introduction port and the outside air introduction port are opened at the same time.

The blower 242 that blows the air drawn through the inside/outside air switching device 243 toward the vehicle interior is disposed on the air flow downstream side of the inside/outside air switching device 243. The blower 242 is an electric blower that drives a centrifugal multi-blade fan (a sirocco fan) with an electric motor, and a rotation speed (an air blowing rate) of the blower 242 is controlled according to a control voltage that is output from the ECU 300.

The evaporator 250 and the interior condenser 230 are disposed on the air flow downstream side of the blower 242 in this order. In other words, the evaporator 250 is disposed on the upstream side of the interior condenser 230 along the air flow.

Further, an air mixing door 244 for adjusting an air volume ratio of the air that passes through the interior condenser 230 in the air that has passed through the evaporator 250 is disposed on the air flow downstream side of the evaporator 250 and on the air flow upstream side of the interior condenser 230. A mixing space 245 for mixing the air heated by heat exchange with the refrigerant in the interior condenser 230 and the air not heated by bypassing the interior condenser 230 together is provided on the air flow downstream side of the interior condenser 230.

An opening hole through which the air merged in the mixing space 245 is blown out into the vehicle interior, which is a cooling target space, as an air conditioning wind is provided on the air flow most downstream portion of the casing 241. Therefore, the ratio of the air volume that is allowed to pass through the interior condenser 230 by the air mixing door 244 is adjusted to adjust a temperature of the air mixed in the mixing space 245, and adjust the temperature of the air blown out from the opening hole. In other words, the air mixing door 244 configures a temperature adjustment unit for adjusting the temperature of air (air conditioning wind) blown into the vehicle interior.

In other words, in the interior condenser 230 configuring the usage side heat exchanger, the air mixing door 244 serves as a heat exchange amount adjustment unit that adjusts the heat exchange amount between the discharged refrigerant discharged from the electric compressor 210 and the air blown into the vehicle interior. The air mixing door 244 is driven by a servomotor (not shown) whose operation is controlled according to the control signal output from the ECU 300.

The ECU 300 is an electronic control unit (ECU) including a well-known microcomputer including a CPU, a ROM, a RAM and the like, and peripheral circuits of the microcomputer.

The ECU 300 receives sensor signals from an air conditioning control sensor set such as an inside air sensor not shown, an outside air sensor, an insolation sensor, a high-pressure side pressure sensor, and the like. Further, the ECU 300 receives operation signals of various air conditioning operation switches from an operation panel not shown disposed in the vicinity of the instrument panel in a front portion of the vehicle compartment. The ECU 300 performs various calculations and processes according to an air conditioning control program stored in the ROM. As a result, the ECU 300 outputs the control signals to various air-conditioning control devices such as the inverter 220 of the electric compressor 210, the two-way valve 262, the exterior fan 271, the three-way valve 280, and the blower 242, and controls the operation of each equipment. The overall configuration of the air conditioning apparatus 100 according to the present embodiment is described above.

Figure 4:
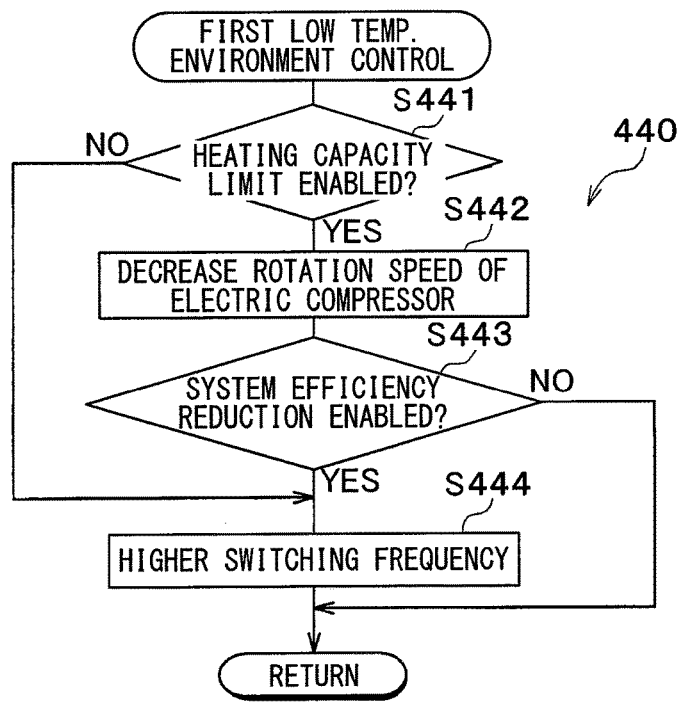
FIG. 4 is a flowchart illustrating a content of a first low temperature environmental control.
Figure 5:
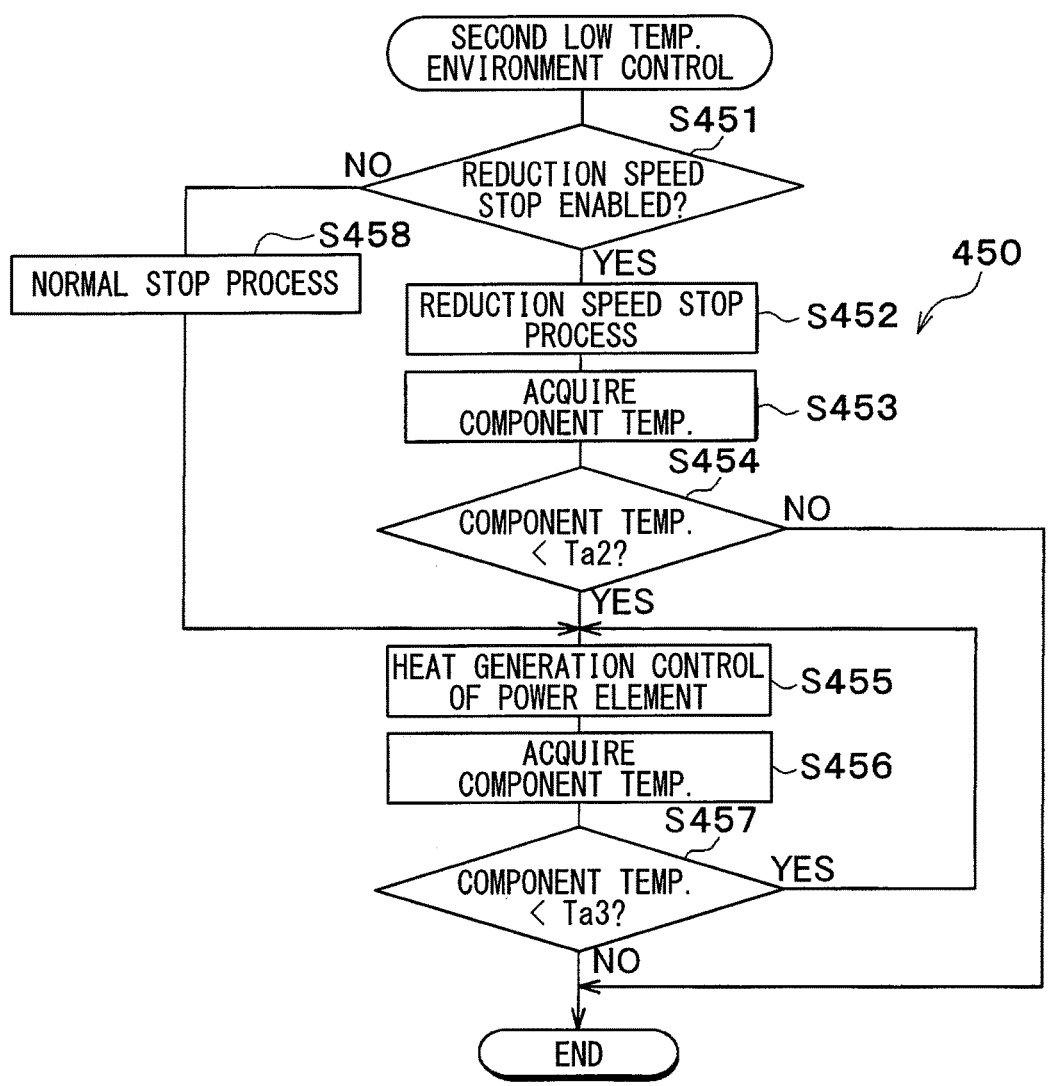
FIG. 5 is a flowchart illustrating a content of a second low temperature environmental control.

Next, the operation of the air conditioning apparatus 100 will be described. The air conditioning apparatus 100 starts a process illustrated in FIG. 3 when the user operates the operation panel in the vehicle compartment. The contents illustrated in FIGS. 3 to 5 can also be implemented in the microcomputer mounted on the inverter 220, but will be described as the control of the ECU 300 in the present embodiment.

First, the ECU 300 acquires a component temperature of the inverter 220 (S400). In other words, the ECU 300 receives a temperature signal from the temperature detection element 226 mounted on the inverter 220. The ECU 300 determines whether the component temperature of the inverter 220 is lower than a predetermined first reference temperature Ta1, or not (S410).

The first reference temperature Ta1 is a temperature at which the inverter may be excessively cooled when the inverter 220 has been cooled to such an extent that the component temperature of the inverter 220 falls below the temperature. Therefore, the first reference temperature Ta1 is set to a temperature higher than a minimum guaranteed temperature of each component configuring the inverter 220 (refer to FIG. 6 to be described later). Since the inverter 220 is configured by multiple electronic components such as the power element 224, the minimum guaranteed temperature of the inverter 220 is set to a highest minimum guaranteed temperature among the minimum guaranteed temperatures of the respective components.

If the component temperature of the inverter 220 is higher than the first reference temperature Ta1, the ECU 300 performs a normal environment control (S420). More specifically, the ECU 300 first calculates a target blowing temperature which is a target temperature of the air blown into the vehicle interior on the basis of the sensor signals and the operation signals of the operation panel described above. The ECU 300 performs a feedback control to adjust the rotation speed of the electric compressor 210 or the like so that the target blowing temperature coincides with an actual blowing temperature which is an actual temperature in the vehicle interior.

For example, in the heating operation, the ECU 300 closes the two-way valve 262 and switches the three-way valve 280 to a refrigerant flow channel that connects the outlet side of the exterior condenser 270 and the inlet side of the accumulator 290. As a result, the heat pump cycle 200 is switched to the refrigerant flow channel through which the refrigerant flows in the electric compressor 210, the interior condenser 230, the heating expansion valve 260, the exterior condenser 270, the three-way valve 280, the accumulator 290, and the electric compressor 210.

In the heat pump cycle 200 at the time of the normal heating operation, the high-pressure refrigerant discharged from the electric compressor 210 flows into the interior condenser 230. The refrigerant flowing into the interior condenser 230 exchanges a heat with the air that has been blown from the blower 242 and passed through the evaporator 250 to radiate the heat. As a result, the air is heated.

On the other hand, in the cooling operation, the ECU 300 opens the two-way valve 262 and switches the three-way valve 280 to a refrigerant flow channel that connects the outlet side of the exterior condenser 270 and the inlet side of the cooling expansion valve 281. As a result, the heat pump cycle 200 is switched to the refrigerant flow channel through which the refrigerant flows in the electric compressor 210, the interior condenser 230, the two-way valve 262, the exterior condenser 270, the three-way valve 280, the cooling expansion valve 281, the evaporator 250, the accumulator 290, and the electric compressor 210.

In the heat pump cycle 200 at the time of the cooling operation, the high-pressure refrigerant discharged from the electric compressor 210 flows into the interior condenser 230 and exchanges the heat with the air that has been blown from the blower 242 and passed through the evaporator 250 to radiate the heat. The high-pressure refrigerant that has flowed out from the interior condenser 230 flows into the exterior condenser 270 through the bypass passage 261 since the two-way valve 262 is opened. The low-pressure refrigerant that has flowed into the exterior condenser 270 further radiates the heat to the outside air blown by the exterior fan 271.

The three-way valve 280 switches to a refrigerant flow channel that connects the outlet side of the exterior condenser 270 and an inlet side of the cooling expansion valve 281. As a result, the refrigerant that has flowed out of the exterior condenser 270 is reduced in pressure and expanded by the cooling expansion valve 281. The refrigerant that has flowed out from the cooling expansion valve 281 flows into the evaporator 250, and absorbs the heat from the air blown by the blower 242 to evaporate. As a result, the air is cooled.

The ECU 300 again acquires the component temperature of the inverter 220, and if the component temperature is higher than the first reference temperature Ta1, the ECU 300 repetitively executes the normal environment control described above.

Further, when the component temperature of the inverter 220 is lower than the first reference temperature Ta1, there is a possibility that the temperature of the inverter 220 falls below the minimum guaranteed temperature. For that reason, the ECU 300 performs, on the inverter 220, any one or both of a control for reducing the self-cooling amount of the electric compressor 210 (the second low temperature environment control) and a control for increasing the self-heat generation amount of the inverter 220 (the first low temperature environment control) of the inverter 220.

In this example, the control for reducing the self-cooling amount of the electric compressor 210 represents a control for reducing a capacity for cooling the inverter 220 by the refrigerant flowing into the electric compressor 210. The control for increasing the self-heat generation amount of the inverter 220 is a control for increasing the amount of heat generated by the inverter 220 by increasing the electric operation amount of the inverter 220.

First, the ECU 300 determines whether a stop signal has been received, or not (S430). The stop signal is a signal indicating that the air conditioning control is to be stopped. For example, when the user operates the operation panel so as to stop the air conditioning in the vehicle interior or when a power supply of the vehicle is stopped, the ECU 300 receives the stop signal from the operation panel, another ECU or the like.

When the ECU 300 does not receive the stop signal, the ECU 300 executes the first low temperature environment control (S440). When the component temperature of the inverter 220 is lower than the first reference temperature Ta1, the vehicle is placed in an extremely low outside air temperature, and the user usually uses heating. Therefore, in executing the first low temperature environment control, it is assumed that the air conditioning apparatus 100 is performing the heating operation. Hereinafter, the contents of the first low temperature environment control will be described with reference to FIG. 4.

First, the ECU 300 determines whether the heating capacity of the electric compressor 210 can be limited, or not (S441). The ECU 300 executes the determination based on, for example, the remaining capacity of the battery. When the remaining capacity of the battery is higher than the predetermined value, the heating capacity can be limited, and when the remaining capacity of the battery is lower than the predetermined value, it is difficult to limit the heating capacity. Incidentally, it may be determined whether the heating capacity can be limited with reference to other determination criteria.

If the heating capacity can be limited, the ECU 300 controls the inverter 220 so that the rotation of the electric compressor 210 is decelerated (S442). In other words, the ECU 300 reduces the rotation speed of the electric motor 210*a* of the electric compressor 210. As a result, since the flow rate of the refrigerant flowing into the electric compressor 210 decreases, the self-cooling amount of the electric compressor 210 decreases. Therefore, the excessive cooling of the inverter 220 can be prevented.

Thereafter, the ECU 300 determines whether the efficiency of the heat pump cycle 200 can be reduced, or not (S443). The ECU 300 executes the determination based on, for example, the remaining capacity of the battery. When the remaining capacity of the battery is higher than the predetermined value, the efficiency of the heat pump cycle 200 can be reduced. When the remaining capacity of the battery is lower than the predetermined value, it is difficult to reduce the efficiency of the heat pump cycle 200. It should be noted that it can be also determined whether the efficiency of the heat pump cycle 200 can be reduced with the use of other criteria.

If the efficiency of the heat pump cycle 200 can be reduced, the ECU 300 drives the inverter 220 so that the switching speed of the inverter 220 increases (S444). That is, with an increase in the switching frequency speed of the power element 224, the switching loss of the power element 224 increases, and the power element 224 generates heat. As a result, since the inverter 220 per se generates the heat, the self-heat generation amount of the inverter 220 increases. Therefore, the excessive cooling of the inverter 220 can be prevented.

Figure 3:
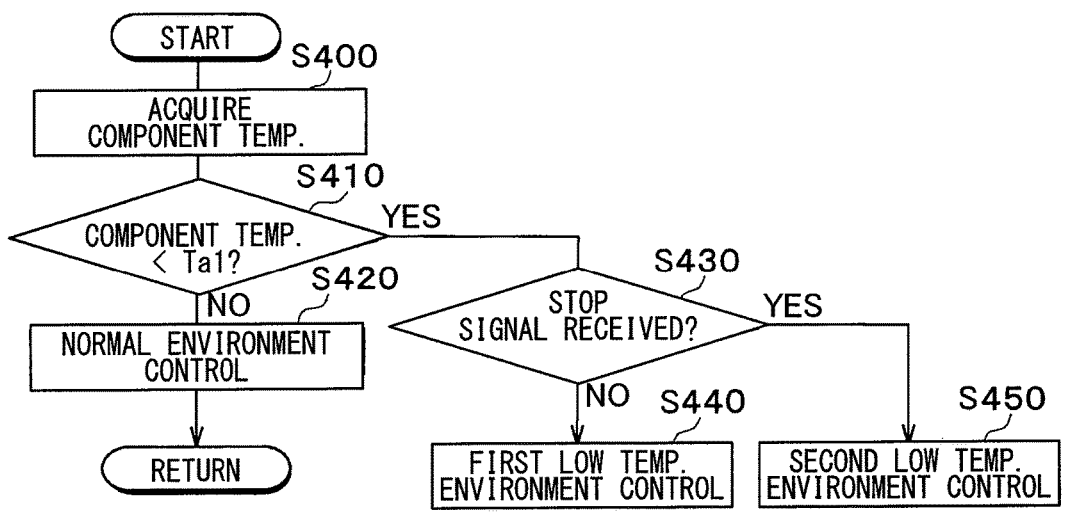
FIG. 3 is a flowchart illustrating a control content of an air conditioner control ECU or an inverter.

Thereafter, the ECU 300 returns to S400 illustrated in FIG. 3 to acquire the component temperature of the inverter 220 again. In the first low temperature environment control illustrated in FIG. 4, when it is difficult to limit the heating capacity, the ECU 300 drives the inverter 220 so that the switching speed of the inverter 220 rises, to thereby increase the self-heat generation amount of the inverter 220. On the other hand, when the ECU 300 determines that it is difficult to lower the efficiency of the heat pump cycle 200 after the rotation speed of the electric compressor 210 has been reduced, the ECU 300 completes the first low temperature environment control, and as illustrated in FIG. 3, the process returns to S400.

If the ECU 300 receives the stop signal from an external device such as an operation panel while the ECU 300 is performing the above-described control, the ECU 300 executes the second low temperature environment control (S430, S450). Hereinafter, the contents of the second low temperature environment control will be described with reference to FIG. 5.

First, the ECU 300 determines whether the rotation of the electric compressor 210 can stop at a reduction speed (S451). The ECU 300 performs the above determination based on, for example, whether a special flag is set, or not.

The special flag is a flag set when the rotation control of the electric motor 210*a* of the electric compressor 210 is difficult, such as when a high voltage is used when the vehicle is traveling, when the power supply of the vehicle is turned off, and when an abnormality occurs in the heat pump cycle 200. When the special flag is not set, the rotation of the electric motor 210*a* of the electric compressor 210 can stop at a reduction speed, and when the special flag is set, it is difficult to stop the rotation of the electric compressor 210 at the reducing speed.

If the special flag is not set, the ECU 300 controls the inverter 220 so as to gently stop the rotation of the electric motor 210*a* of the electric compressor 210 (S452). In other words, when the electric compressor 210 is normally stopped, the electric motor 210*a* abruptly stops, but in this example, the electric motor 210*a* is stopped while the rotation is slowed down so as not to stop suddenly.

As a result, when the electric compressor 210 is suddenly stopped, the refrigerant continues to flow into the electric compressor 210 due to the inertia of the refrigerant, but when the electric compressor 210 is gradually stopped, the flow rate of the refrigerant flowing into the electric compressor 210 can be reduced. In other words, the self-cooling amount of the electric compressor 210 decreases. Therefore, the excessive cooling of the inverter 220 can be prevented.

Thereafter, the ECU 300 acquires the component temperature of the inverter 220 (S453), and determines whether the component temperature of the inverter 220 is lower than a predetermined second reference temperature Ta2, or not (S454). The second reference temperature Ta2 is a component temperature at which the inverter 220 will not overcool after stopping the electric compressor 210, and is set, for example, between the component temperature and the minimum guaranteed temperature in a low temperature environment (refer to FIG. 6 to be described later).

If the component temperature of the inverter 220 is higher than the second reference temperature Ta2, the ECU 300 performs the second low temperature environment control. On the other hand, when the component temperature of the inverter 220 is lower than the second reference temperature Ta2, the ECU 300 performs a control for causing the power element 224 of the inverter 220 to generate heat (S455). That is, the ECU 300 operates the power element 224 so that the electric motor 210a of the electric compressor 210 does not rotate, thereby causing the power element 224 to generate heat. That is, the ECU 300 performs the warm-up control of the power element 224. As a result, the self-heat generation amount of the inverter 220 increases. Therefore, the excessive cooling of the inverter 220 can be prevented.

Thereafter, the ECU 300 acquires the component temperature of the inverter 220 (S456), and determines whether the component temperature of the inverter 220 is lower than a predetermined third reference temperature Ta3, or not (S457). The third reference temperature Ta3 is a component temperature at which there is a high possibility that the inverter 220 will overcool after stopping the electric compressor 210, and is set, for example, between the third reference temperature Ta3 and the minimum guaranteed temperature (refer to FIG. 6 to be described later).

If the component temperature of the inverter 220 is higher than the third reference temperature Ta3, the ECU 300 performs the second low temperature environment control. On the other hand, when the component temperature of the inverter 220 is lower than the third reference temperature Ta3, the ECU 300 performs a control for causing the power element 224 of the inverter 220 to generate heat again.

Further, when the special flag is set, that is, when it is difficult to stop the rotation of the electric compressor 210 at the reduction speed, the ECU 300 normally stops the electric compressor 210 (S458). That is, the electric motor 210a abruptly stops. Thereafter, the ECU 300 performs a control for causing the power element 224 to generate heat until the component temperature of the inverter 220 becomes higher than the third reference temperature Ta3 (S455, S456, S457).

As a result, the sudden stop of the electric motor 210a causes the refrigerant to continue to flow into the electric compressor 210 due to inertia, but since the self-heat generation amount of the inverter 220 rises, the excessive cooling of the inverter 220 can be prevented.

If the component temperature of the inverter 220 is higher than the third reference temperature Ta3, the ECU 300 completes the second low temperature environment control.

Figure 6:
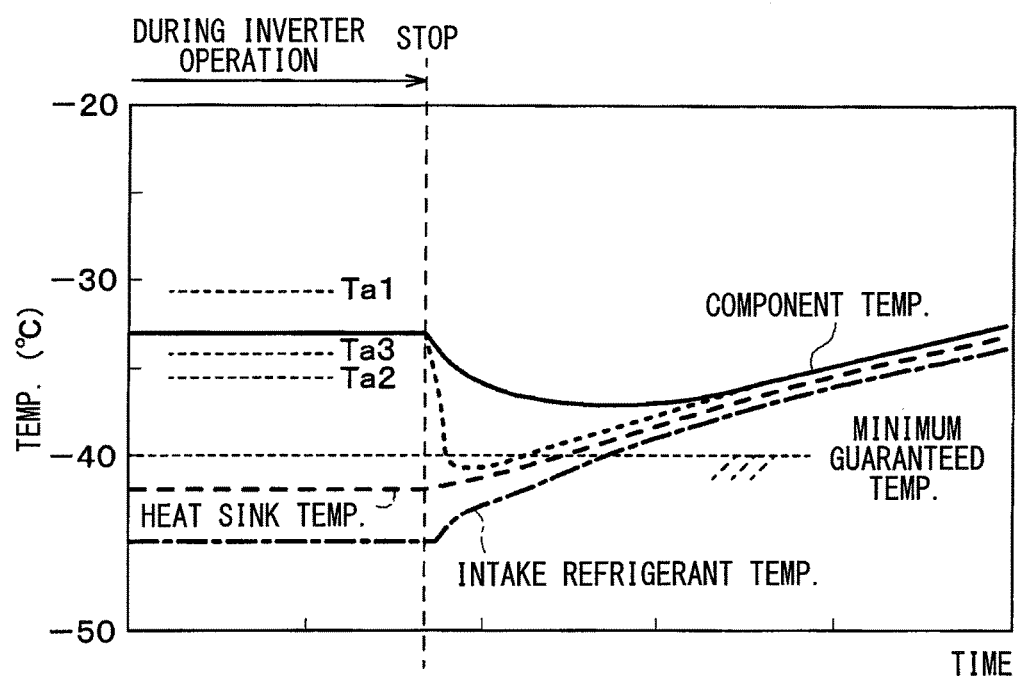
FIG. 6 is a diagram illustrating a change in a component temperature before and after the operation of the inverter is stopped.

The ECU 300 performs the above-described control with the result that, as illustrated in FIG. 6, the component temperature does not fall below the minimum guaranteed temperature under the first low temperature environment control during the operation of the inverter 220. Further, when the inverter 220 is stopped according to the stop signal, the self-cooling amount of the electric compressor 210 is decreased under the second low temperature environment control, or the self-heat generation amount of the inverter 220 is increased. Therefore, after the inverter 220 has been stopped, the component temperature does not fall below the minimum guaranteed temperature.

During the operation of the inverter 220, the temperature of the intake refrigerant drawn into the electric compressor 210 is the lowest. Further, the heat sink 222 is cooled by the refrigerant and is lower than the minimum guaranteed temperature of the component temperature of the inverter 220. The intake refrigerant temperature and the temperature of the heat sink 222 become substantially the same as the component temperature due to the stop of the inverter 220.

As described above, when the component temperature of the inverter 220 becomes lower than the first reference temperature Ta1, the ECU 300 performs any one or both of a control for reducing the self-cooling amount of the electric compressor 210 and a control for increasing the self-heat generation amount of the inverter 220. As a result, in the low temperature environment, the excessive cooling of the inverter 220 can be prevented by the aid of the refrigerant, and the inverter 220 can be prevented from being destroyed.

It should be noted that the temperature detection element 226 according to the present embodiment corresponds to a "temperature detection unit" of the present disclosure and the ECU 300 corresponds to a "control unit" of the present disclosure. In addition, devices such as the operation panel and other ECUs correspond to an "external device" of the present disclosure. Further, the first reference temperature Ta1 corresponds to a "reference temperature" of the present disclosure.

Further, the inverter 220 having the power element 224 and the circuit board 225 which are components for rotating the electric motor 210a of the electric compressor 210 according to the control signal corresponds to a "drive unit" of the present disclosure.

Other Embodiments

Hereinbefore, the preferred embodiments of the present disclosure have been described. However, the present disclosure is not intended to be limited to the embodiments described above, and various modifications can be made without departing from the spirit of the invention. The structures of the embodiment are merely illustrative, and the scope of the present disclosure is not limited to the range of the description of the structures. The scope of the present disclosure encompasses meanings equivalent to the description in the present disclosure and all changes within the scope of the description.

The configuration of the air conditioning apparatus 100 described in the above embodiments and the control content of the ECU 300 are an example, and can be replaced with other configurations that can realize the present disclosure without being limited to the configuration described above.

For example, in the first low temperature environment control, any one or both of the control for reducing the rotation speed of the electric motor 210a of the electric compressor 210 (S442) and the control for increasing the switching speed of the inverter 220 (S444) are performed. However, in the first low temperature environment control, only the control for reducing the rotation speed of the electric motor 210a of the electric compressor 210 may be performed. In the first low temperature environment control, only the control for increasing the switching speed of the inverter 220 may be performed.

Further, in the first low temperature environment control, the self-cooling amount of the electric compressor 210 can be reduced under the following control. For example, when operating in a single-stage heat pump cycle, there is a method of switching to a multi-stage compression cycle such as a gas injection cycle. In addition, there is a method of accelerating the rotation of the exterior fan 271 to heat the intake refrigerant drawn into the electric compressor 210 by the outside air temperature.

Further, in the first low temperature environment control, the self-heat generation amount of the inverter 220 can be increased under the following control. For example, when a two-phase modulation control is implemented by the inverter 220, there is a method of switching to a three-phase modulation control. There is also a method of implementing a forced field or a field weakening in the electric compressor 210. Further, in the air conditioning control, there is a method of increasing the discharged refrigerant pressure of the electric compressor 210 to put into a high load state by switching to the inside air flow mode. With an increase in the rotation speed of the electric compressor 210, the amount of the inflow refrigerant flowing into the electric compressor 210 increases, but there is also a method of further increasing the self-heat generation amount of the inverter 220.

For example, in the second low temperature environment control, any one or both of the control for gently stopping the rotation of the electric motor 210a of the electric compressor 210 (S452) and the control for causing the power element 224 of the inverter 220 to generate heat (S455) are performed. However, in the second low temperature environment control, only the control for gently stopping the rotation of the electric motor 210a of the electric compressor 210 may be implemented. In the second low temperature environment control, only the control for causing the power element 224 of the inverter 220 to generate heat may be implemented.

In the second low temperature environment control, a refrigerant cutoff valve is provided in the refrigerant intake port 212 of the electric compressor 210, and the refrigerant cutoff valve is closed when the electric compressor 210 is stopped, whereby the flow of the refrigerant into the electric compressor 210 can stop to reduce the self-cooling amount of the electric compressor 210.

Furthermore, in the second low temperature environment control, the electric motor 210a of the electric compressor 210 is energized at an electrical angle at which the electric motor 210a does not rotate to cause the power element 224 and a motor winding to generate heat, thereby being capable of raising the self-heat generation amount of the inverter 220.

In the above embodiment, the ECU 300 executes the control that combines the first low temperature environment control with the second low temperature environment control, but may implement only any one of those controls.

In the above embodiment, the ECU 300 performs the implementation of the first low temperature environment control and the second low temperature environment control, and the determination of whether to implement the first low temperature environment control or the second low temperature environment control. However, the implementation of the first low temperature environment control and the second low temperature environment control, and the determination of whether to implement the first low temperature environment control or the second low temperature environment control may be performed by a microcomputer per se provided in the inverter 220. In other words, a control unit for implementing the first low temperature environment control and the second low temperature environment control and determining whether to implement the first low temperature environment control and the second low temperature environment control may be integrated with the inverter 220.

The above air conditioning apparatus 100 is mounted on a vehicle, but the air conditioning apparatus 100 is not limited to the vehicle purpose.

The invention claimed is:

1. An air conditioning apparatus comprising:
an electric compressor that compresses a refrigerant drawn from a refrigerant intake port and discharges the refrigerant from a refrigerant discharge port;
a drive unit that is integrated with the electric compressor so as to be cooled by the refrigerant drawn from the refrigerant intake port of the electric compressor, the drive unit operating the electric compressor according to a control signal;
a temperature detection unit that detects a temperature of the drive unit; and
a control unit that outputs the control signal to the drive unit to control the drive unit, wherein
the control unit is configured to, when the temperature detected by the temperature detection unit is lower than a predetermined reference temperature, perform with respect to the drive unit any one or both of:
a control for reducing a self-cooling amount of the electrio compressor, and
a control for increasing a self-heat generation amount of the drive unit, and
the control unit controls the drive unit to reduce a rotation speed of the electric compressor as the control for reducing the self-cooling amount of the electric compressor.

2. The air conditioning apparatus according to claim 1, wherein
the drive unit includes a power element for driving the electric compressor, and
the control unit drives the drive unit to increase a switching speed of the power element as the control for increasing the self-heat generation amount of the drive unit.

3. The air conditioning apparatus according to claim 1, wherein
the drive unit includes a power element for driving the electric compressor, and
the control unit operates the power element not to rotate the electric compressor and causes the power element to generate heat when receiving a stop signal for stopping the electric compressor from an external device as the control for increasing the self-heat generation amount of the drive unit.

4. The air conditioning apparatus according to claim 1, wherein
the drive unit comprises an inverter, and the control unit is integrated with the inverter.

5. An air conditioning apparatus comprising:
an electric compressor that compresses a refrigerant drawn from a refrigerant intake port and discharges the refrigerant from a refrigerant discharge port;
a drive unit that is integrated with the electric compressor so as to be cooled by the refrigerant drawn from the refrigerant intake port of the electric compressor, the drive unit operating the electric compressor according to a control signal;
a temperature detection unit that detects a temperature of the drive unit; and
a control unit that outputs the control signal to the drive unit to control the drive unit, wherein the control unit is configured to, when the temperature detected by the temperature detection unit is lower than a predetermined reference temperature, perform with respect to the drive unit any one or both of:
- a control for reducing a self-cooling amount of the electric compressor, and
- a control for increasing a self-heat generation amount of the drive unit, and the control unit controls the drive unit to gently stop the rotation of the electric compressor when receiving a stop signal for stopping the electric compressor from an external device as the control for reducing the self-cooling amount of the electric compressor.

6. An air conditioning apparatus comprising:
an electric compressor that includes an electric motor, the electric compressor being configured to, according to a rotation of the electric motor, compress a refrigerant drawn from a refrigerant intake port and discharge the refrigerant from a refrigerant discharge port;
a drive unit that is integrated with the electric compressor so as to be cooled by the refrigerant drawn from the refrigerant intake port of the electric compressor, and controls a rotation of the electric motor;
a control unit that outputs a control signal to the drive unit to control the drive unit; and
a temperature detection unit that detects a temperature of the drive unit, wherein
the control unit is configured to, when the temperature detected by the temperature detection unit is lower than a predetermined reference temperature, perform with respect to the drive unit any one or both of:
- a control for reducing a self-cooling amount of the electric compressor, and
- a control for increasing a self-heat generation amount of the drive unit, and the control unit controls the drive unit to reduce a rotation speed of the electric compressor as the control for reducing the self-cooling amount of the electric compressor.

7. The air conditioning apparatus according to claim 6, wherein
the control unit controls the drive unit to reduce the rotation speed of the electric motor to reduce a flow rate of the refrigerant drawn through the refrigerant intake port.

8. An air conditioning apparatus comprising:
an electric compressor that includes an electric motor, the electric compressor being configured to, according to a rotation of the electric motor, compress a refrigerant drawn from a refrigerant intake port and discharge the refrigerant from a refrigerant discharge port;
a drive unit that is integrated with the electric compressor so as to be cooled by the refrigerant drawn from the refrigerant intake port of the electric compressor, and controls a rotation of the electric motor;
a control unit that outputs a control signal to the drive unit to control the drive unit; and
a temperature detection unit that detects a temperature of the drive unit, wherein
the control unit is configured to, when the temperature detected by the temperature detection unit is lower than a predetermined reference temperature, perform with respect to the drive unit any one or both of:
- a control for reducing a self-cooling amount of the electric compressor, and
- a control for increasing a self-heat generation amount of the drive unit, and the control unit controls the drive unit to gently stop the rotation of the electric compressor when receiving a stop signal for stopping the electric compressor from an external device as the control for reducing the self-cooling amount of the electric compressor.

\* \* \* \* \*